United States Patent [19]

Gumkowski et al.

[11] 4,415,068
[45] Nov. 15, 1983

[54] DISC BRAKE AND ANTIRATTLE SPRING THEREFOR

[75] Inventors: Bert A. Gumkowski, South Bend; John F. Limberg, Granger, both of Ind.

[73] Assignee: The Bendix Corporation, Southfield, Mich.

[21] Appl. No.: 283,756

[22] Filed: Jul. 16, 1981

[51] Int. Cl.³ .............................................. F16D 55/22
[52] U.S. Cl. .................. 188/72.3; 188/73.38; 188/216; 192/30 V; 192/70.28
[58] Field of Search ................. 188/72.3, 73.35, 73.36, 188/73.37, 73.38, 73.44, 205 A, 216; 192/30 V, 70.28

[56] References Cited

U.S. PATENT DOCUMENTS

| | | | |
|---|---|---|---|
| 3,841,445 | 10/1974 | Rinker | 188/73.38 |
| 4,027,751 | 6/1977 | Gerard | 188/73.38 |
| 4,056,174 | 11/1977 | Wienand et al. | 188/73.36 |
| 4,151,899 | 5/1979 | Wright | 188/73.44 |
| 4,171,037 | 10/1979 | Souma et al. | 188/73.38 |
| 4,196,794 | 4/1980 | Matsumoto | 188/73.37 |
| 4,219,105 | 8/1980 | Delaunay | 188/73.38 |
| 4,245,723 | 1/1981 | Moriya | 188/73.38 |

FOREIGN PATENT DOCUMENTS

| | | | |
|---|---|---|---|
| 1164548 | 9/1969 | United Kingdom | 188/73.35 |
| 1535228 | 12/1978 | United Kingdom | 188/73.36 |
| 2031534 | 4/1980 | United Kingdom | 188/73.37 |

*Primary Examiner*—Douglas C. Butler
*Assistant Examiner*—R. R. Diefendorf
*Attorney, Agent, or Firm*—Paul David Schoenle; Ken C. Decker

[57] ABSTRACT

A disc brake (10) includes a support member (22) movably interlocking with a pair of friction elements (42, 44) to dispose the friction elements adjacent a rotatable brake disc (12). The friction elements define abutment surfaces (88, 90) movably engaging a caliper (60) straddling the brake disc (12) and friction elements (42, 44) so that the friction elements support the caliper. An axially-extending pin (110) is carried by the support member (22) and received in an axially-extending bore (112) defined by the caliper so that the caliper (60) is also supported by the axially-extending pin. The caliper (60) includes pairs of axially-spaced projections (96, 98, and 100, 102) and the friction elements (42, 44) define slots (92, 94) aligning with the projections. A pair of resilient members (104, 106) extend axially through the slots (92, 94) of the friction members (42, 44) and engage the projections (96, 98, and 100, 102) of the caliper to interlock the caliper (60) and friction elements (42, 44). Another pair of resilient members (118, 120) carried by the support member (22) engage the friction elements (42, 44) to prevent their rattling against the support member. The other pair of resilient members (118, 120) also bias the friction elements (42, 44) away from the brake disc (12).

1 Claim, 5 Drawing Figures

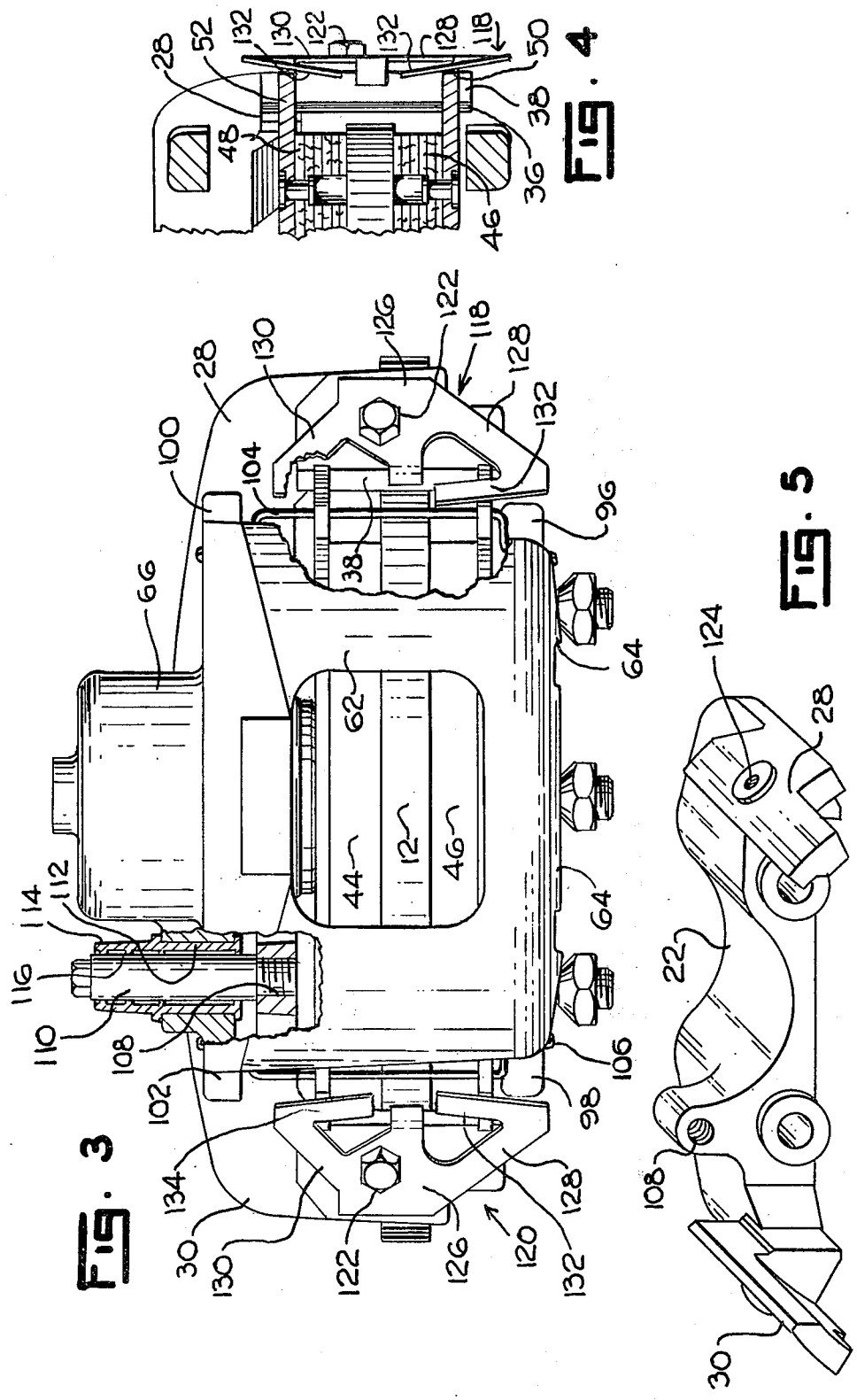

DISC BRAKE AND ANTIRATTLE SPRING THEREFOR

The invention relates to a disc brake. More particularly, the invention relates to a disc brake of the type including a rotatable brake disc having friction faces thereon. A caliper includes a pair of legs straddling the brake disc and cooperating with a pair of friction elements to urge the friction elements into engagement with the friction faces of the brake disc. A non-rotatable support member movably carries the caliper. The support member substantially prevents radial and circumferential movement of the caliper while allowing axial movement of the caliper relative to the brake disc.

Accordingly, this invention relates to a disc brake comprising a non-rotatable support member having a pair of circumferentially spaced, axially extending arms defining a recess therebetween, a pair of friction elements received in said recess, a caliper received in said rcess and cooperating with said pair of friction elements to urge the latter toward one another, and a resilient member engaging one of said pair of friction elements to restrain rattling thereof.

A sliding caliper disc brake is known in accordance with the U.S. Pat. No. 4,027,751, (hereinafter '751) issued June 7, 1977 to J. Gerard wherein a support member carries a pair of circumferentially spaced, axially-extending pins. A caliper defines a pair of bores which slidably receive the axially-extending pins so that the caliper is movably carried on the axially-extending pins. The caliper defines a pair of legs straddling the brake disc. A recess defined by the caliper between the pair of legs receives a pair of friction elements which interlock with the caliper. Each of the pair of friction elements carries a noise-reducing spring which engages the caliper to bias torque-transferring abutment surfaces of the friction elements and caliper into engagement with one another.

Another sliding caliper disc brake is known in accordance with the U.S. Pat. No. 4,056,174 (hereinafter '174), issued Nov. 1, 1977 to H. Wienand et al, wherein a support member includes a pair of circumferentially spaced, axially extending arms which are radially spaced outwardly of the perimeter of the brake disc. The arms extend axially through the radial planes defined by the friction faces of the brake disc and define a recess therebetween. A pair of friction elements are received in the recess in torque-transferring abutting relation with the arms of the support member. The arms of the support member define a pair of axially extending bores therein. A caliper is received in the recess of the support member and carries a pair of axially extending pins which are slidably received in the bores of the support member. As a result, the caliper is slidably carried by the support member via the axially extending pins. The caliper defines a pair of legs which straddle the brake disc and the pair of friction elements. Each of the friction elements carries a spring which engages the caliper to urge the friction element radially inwardly within the recess of the support member.

With a disc brake of the type illustrated by the '751 patent, all of the braking torque is transferred from the friction elements to the caliper during a brake application. The caliper transfers the braking torque to the support member via the axially extending pins. Because the friction elements are offset axially relative to the pair of pins, the caliper may pivot relative to the brake disc and support member. The caliper may pivot in an axially extending plane which is defined by the axes of the pair of pins. As a result, the caliper may not slide freely on the pair of pins during a brake application. Further, as is well known in the art, reaction forces on the caliper during a brake application distort the caliper so that the caliper legs are spread apart or forced to move axially away from each other. As a result, the caliper legs are angulated relative to each other. Because the caliper legs oppose the friction elements, angulation of the caliper legs causes angulation of the friction elements and resultant uneven wear. Additionally, because the friction elements engage a circumferentially extending segment of the brake disc, a portion of the friction elements is subject to friction forces having a radially outwardly directed component. The outwardly directed friction forces are transferred to the caliper. As a result, the caliper may tilt radially outwardly. The caliper may tilt in an axially extending radial plane extending between the pair of pins. In the case of the outboard friction element which is on the side of the brake disc opposite the pair of pins, the tilting of the caliper adds to the angulation of the caliper leg caused by distortion of the caliper so that uneven wear of the outboard friction element is exacerbated.

With a disc brake of the type illustrated by the '174 patent, the friction elements cooperate with the support member so that braking torque is transferred directly to the support member during a brake application. However, the reaction forces distort the caliper, as was explained supra, so that the caliper legs are angulated relative to one another. Further, the outwardly directed radial friction forces are transferred from the friction elements to the caliper because of the frictional engagement of the caliper legs with the friction elements during a brake application. Consequently, tilting of the caliper results and exacerbates the uneven wear of the outboard friction element.

A further recognized deficiency of known sliding caliper disc brakes is the frictional drag of the friction elements, particularly, the outboard friction element, upon the brake disc when the brake is not applied. This unwanted frictional drag contributes to an increased fuel consumption for the vehicle upon which the brake is employed.

Further, disc brakes according to both the '751 and '174 patents include a pair of axially-extending pins carried by the support member or caliper and a pair of bores defined by the caliper or support member for slidably receiving the axially-extending pins. Because the axially-extending pins and bores must precisely conicide with each other in order for the caliper to be axially movable relative to the support member and brake disc, precision manufacturing methods must be employed in order to make the disc brakes. Such precision manufacturing methods add substantially to the expense of manufacturing the disc brakes.

The invention as claimed is intended to avoid or ameliorate one or more of the shortcomings of prior brakes by providing a disc brake characterized by said resilient member including a first axially extending resilient arm angularly engaging said one friction element to bias said one friction element away from the other of said pair of friction elements.

The advantages offered by the invention are mainly that the resilient member, because of its angular contact with the friction element, serves both as an anti-rattle spring and biases the friction element away from the brake disc. As a result, the frictional drag of the friction element on the brake disc may be reduced when the brake is not applied.

A preferred embodiment of the invention is described in detail below with reference to drawings which illustrate only the preferred embodiment of the invention, in which:

FIG. 3 is a fragmentary view along line 3—3 of FIG. 1 and partly in cross section of the disc brake illustrated by FIGS. 1 and 2;

FIG. 4 is a fragmentary cross-section view taken along line 4—4 of FIG. 1; and

FIG. 5 is an isolated perspective view of the support member of the disc brake.

Figure 1:
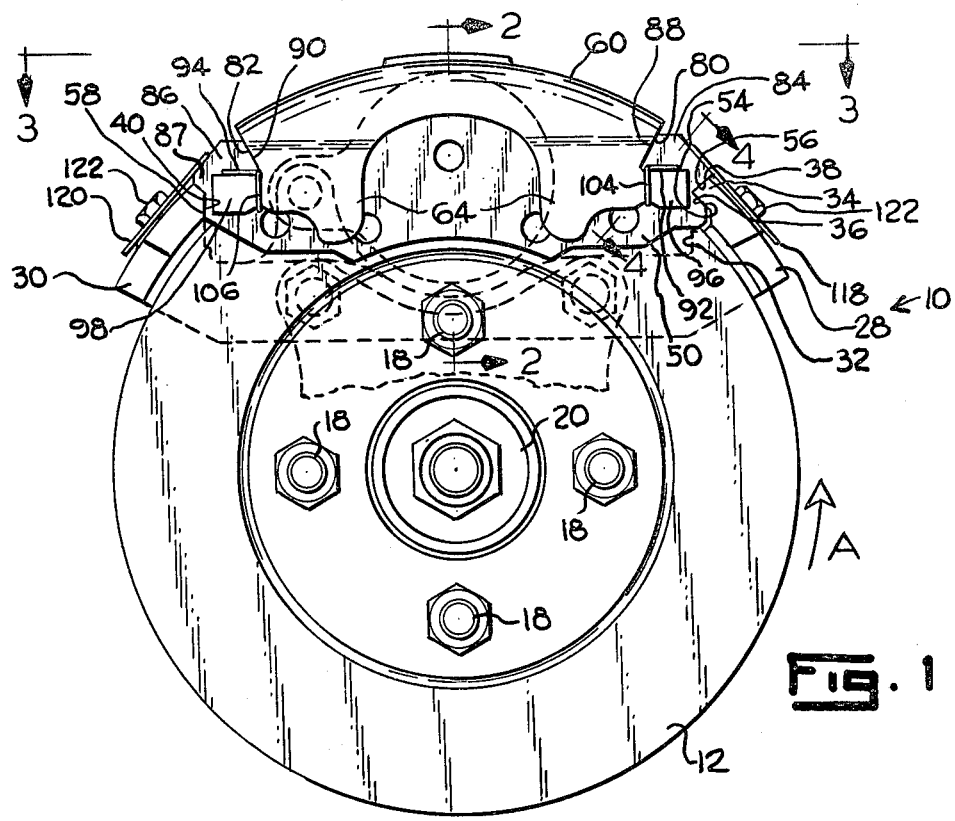
FIG. 1 is an elevation view of a disc brake according to the invention.

The figures show a disc brake 10 including a rotatable brake disc 12 having friction faces 14 and 16 on opposite sides thereof. The brake disc 12 is coupled by threaded fasteners 18 for rotation in unison with an axle 20 to be braked. A non-rotatable support member 22 is connected by threaded fasteners 24 to a torque-taking structure 26 which journals the axle 20. The support member 22 includes a pair of axially-extending arms 28 and 30 which are circumferentially spaced to define a recess 32 therebetween. The arms 28 and 30 are spaced radially outwardly from the perimeter of the brake disc 12 and extend axially through the radial planes defined by the friction faces 14 and 16 on the brake disc, viewing FIG. 3. The arm 28 includes a projection 34 extending circumferentially into the recess 32 to define a pair of axially-extending abutment surfaces 36 and 38. The arm 30 defines an axially-extending abutment surface 40 which extends substantially parallel to a radially extending axial plane through the center of the recess 32.

A pair of friction elements 42 and 44 are movably received in the recess 32 of the support member 22. The friction elements include friction linings 46 and 48, respectively, which are engageable with the friction faces 14 and 16 of the brake disc 12. The friction linings 46 and 48 are secured to backing plates 50 and 52. Each of the backing plates 50 and 52 defines abutment surfaces 54, 56, and 58 slidably engaging the respective abutment surfaces 36, 38, and 40, of the arms 28 and 30 so that the support member 22 may receive braking torque from the friction elements 42 and 44.

Of course, the circumferential dimension of the backing plates 50 and 52 as defined by the surfaces 54–58 is slightly less than that of the recess 32 as defined by the surfaces 36–40. As a result, a small clearance (not illustrated) may exist among the abutment surfaces. Because of the small clearance, the friction elements may be pivoted clockwise out of the recess 32 and removed radially outwardly from the support member 22. Conversely, the friction elements may be inserted radially inwardly into the recess 32 by counterclockwise pivoting movement.

Figure 2:
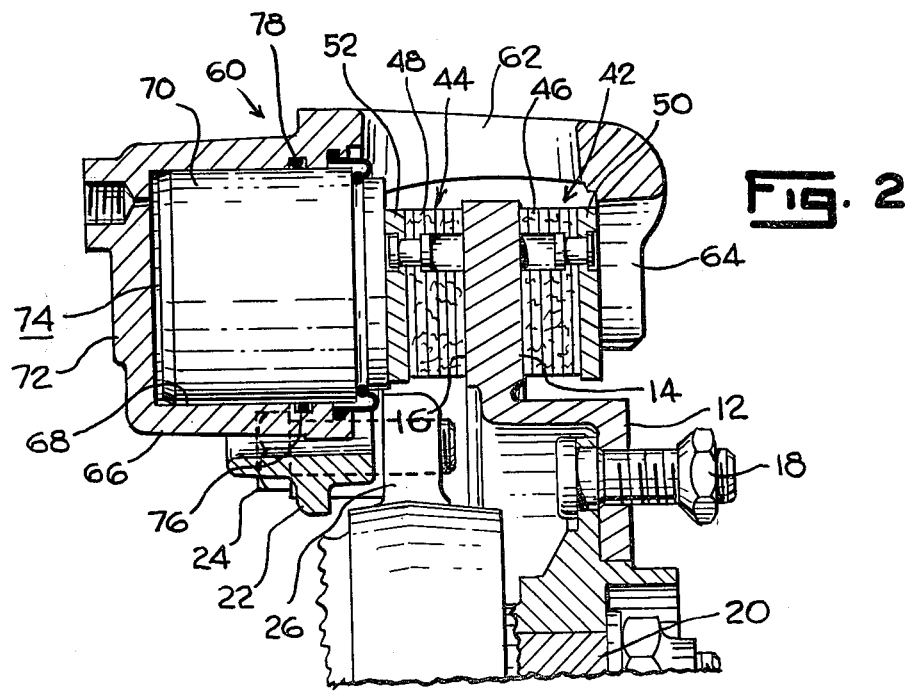
FIG. 2 is a fragmentary cross-sectional view taken along the line 2—2 of FIG. 1.

A caliper 60 is movably received in the recess 32 of the support member 22. The caliper 60 includes a bridge portion 62 and a pair of radially inwardly extending legs 64 and 66, viewing FIG. 2. The leg 66 of caliper 60 defines a bore 68 movably receiving a piston 70 which cooperates with a closed end 72 of the bore 68 to define a variable-volume chamber 74. A groove 76 circumscribes the bore 68 and receives an annular sealing member 78 cooperating with the piston 70. The leg 64 and the piston 70 are engageable with the friction elements 42 and 44, respectively.

The caliper 60 includes radially and axially extending abutment surfaces 80 and 82. Projections 84 and 86 on the backing plates 50 and 52 of each friction element 42 and 44 extend radially outwardly and define abutment surfaces 88 and 90, respectively, slidably engaging the abutment surfaces 80 and 82 of the caliper 60. Of course, the friction element 42 is trapped between the caliper leg 64 and the brake disc 12 so that there is normally no relative sliding movement between the caliper and the friction element 42. The projections 84 and 86 define slots 92 and 94 opening toward the center of the recess 32. The legs 64 and 66 of the caliper 60 define pairs of axially-spaced, circumferentially-extending projections 96, 98, and 100, 102 aligning at their upper surfaces with the slots 92 and 94. A pair of axially-extending resilient members or wire-forms 104 and 106 extend through the slots 92 and 94 of the backing plate projections 84 and 86 and engage the projections 96–102 of the caliper. The resilient members 104 and 106 are identical and have hook-shaped ends which engage the projections 96–102. Both of the resilient members 104 and 106 are torsionally distorted within the slots 92 and 94 so that the abutment surfaces 88 and 90 of the friction elements are resiliently biased into engagement with the abutment surfaces 80 and 82, respectively, of the caliper 60. The projections 86 at the left end of the friction elements 42 and 44 define tab portions 87 which engage the arm 30 to restrain radially inward movement of the friction elements. Thus, it will be observed that the surfaces 36, 38 and 54, 56 at the right end of the friction elements interlock to restrain radial movement of the friction elements in both the inward and outward directions. At the left end of the friction elements, the tabs 87 restrain radially inward movement. Further, the caliper rests upon the friction elements via the surfaces 80, 82 and 88, 90 and is interlocked therewith via the resilient members 104 and 106. Thus, the support member 22 carries the friction elements 42, 44 which in turn carry the caliper 60.

The support member 22 defines a bore 108, viewing FIG. 3, threadably receiving an axially-extending pin portion 110. Similarly, the caliper 60 defines a bore 112 receiving an elongated bushing 114. The bushing 114 defines a bore 116 slidably receiving the pin portion 110 so that the axially-extending pin portion 110 of the support member 22 also supports the caliper 60. Thus, the friction elements 42, 44 are trapped between the arm 30 and caliper 60.

A pair of resilient members 118 and 120 are secured to the arms 28 and 30 of the support member 22 by cap screws 122 which pass through apertures in the resilient members 118, 120 and engage threaded bores 124 in the arms 28 and 30 viewing FIG. 5. The resilient members 118 and 120 are mirror images of each other and each includes a body portion 126 having a pair of axially-extending divergent arms 128 and 130. A pair of resilient arms 132 and 134 extend axially toward each other from the arms 128 and 130, respectively. The arms 132 and 134 also are angulated and extend radially inwardly, viewing FIG. 4, to slidably and angularly engage the projections 84 and 86 of the backing plates 50 and 52 of friction elements 42 and 44. The resilient arms 132 and 134 bias the friction elements radially inwardly. The engagement of the arms 132, 134 with the backing plates 50, 52 is angular with respect to the backing plates and with respect to the rotational axis of the brake disc 12.

Because of the angular engagement of the resilient arms 132 and 134 with the friction elements 42 and 44, the friction elements are also biased axially away from the brake disc 12.

When a brake application is effected with the brake disc 12 rotating in a forward direction, which is indicated by arrow A, viewing FIG. 1, pressurized fluid is supplied to the variable-volume chamber 74, moving the piston 70 rightwardly, viewing FIG. 1. The piston 70 moves the friction element 44 into engagement with the friction face 16 on the brake disc 12. The pressurized fluid in the chamber 74 also acts on the closed end 72 of the bore 68 to move the caliper 60 leftwardly relative the brake disc 12 and support member 22, viewing FIG. 2. Consequently, the caliper 60 moves the friction element 42 into engagement with the friction face 14 on the brake disc 12. The caliper 60 is axially movable relative the support member 22 because the bushing 114 slidably receives the axially-extending pin portion 110 of support member 22, viewing FIG. 3, and because the abutment surfaces 80 and 82 of the caliper slidably engage the abutment surfaces 88 and 90 of the friction element 44 while the outboard friction element 42 slidably engages the support member 22 at the surfaces 34-38 and 54-58 and at tab 87. The inboard friction element 44 is axially movable, relative to the support member 22, because the abutment surfaces 54, 56, and 58 of the backing plate 52 slidably engage the abutment surfaces 36, 38 and 40 on the support member.

Viewing FIG. 1, braking torque generated by the frictional engagement of the friction elements 42 and 44 with the brake disc 12 is transferred from the friction elements to the support member 22 via the abutment surfaces 40 and 58. Because the frictional engagement of the friction linings 46 and 48 with the brake disc 12 extends circumferentially relative the brake disc, the friction elements are subject to a friction force which is directed radially outwardly, tending to pivot the friction elements counterclockwise, viewing FIG. 1. Because the friction elements define an interlocking fit with the support member at the projection 34 of the support member, the outwardly directed radial friction force is transferred to the support member 22 via the abutment surfaces 36 and 54.

When a brake application is effected with the brake disc 12 rotating in the reverse direction, opposite arrow A viewing FIG. 1, braking torque is transferred to the support member via the abutment surfaces 36, 38, 54, and 56. The outwardly directed radial friction force tends to pivot the friction elements clockwise, viewing FIG. 1. Because the friction elements do not define an interlocking fit with the support member 22 at the abutment surfaces 40 and 58, the outwardly directed friction force is transferred from the friction elements to the caliper 60 via the abutment surfaces 82 and 90. The caliper 60 transfers the outwardly directed friction force to the support member 22 via the axially-extending pin 110.

When a brake application is terminated, the pressurized fluid is released from the chamber 74. Consequently, the sealing member 78 retracts the piston 70 to a nonbraking position, as is well known in the art. The axially directed bias applied to the friction elements by the arms 132 and 134 of the resilient members 118 and 120 moves the friction elements away from the friction faces 14 and 16 of the brake disc 12 so that the friction elements do not drag on the brake disc.

Those skilled in the art to which the invention pertains will recognize that sufficient clearance exists between the friction elements and support member to allow the friction elements and caliper 60 to be pivoted clockwise as a unit out of recess 32, viewing FIG. 1, after the pin 110 and resilient member 120 are removed. The resilient members 104 and 106 retain the caliper and friction elements together so that the caliper 60 may be removed from and installed into the recess 32 of the support member 22 as a unit with the friction elements. In order to separate the friction elements from the caliper after the caliper and friction elements have been removed from the recess 32, the friction elements are pivoted away from the caliper at one of their ends (radially inwardly viewing FIG. 1) so that one of the resilient members 104 or 106 snaps out of its slot 92 or 94. The friction elements will then slide off the other of the resilient members. Reassembly of the brake requires only the reversal of the above-outlined procedure.

We claim:

1. A disc brake of the type having a rotatable brake disc, a caliper straddling said brake disc and cooperating with a pair of friction elements to urge the latter axially into engagement with said brake disc, each of said friction elements having a backing plate, a nonrotatable support member supporting said caliper, said support member including a pair of support arms opposing rotation of said pair of friction elements, and an antirattle spring engaging said pair of friction elements to restrain rattling thereof, the improvement wherein said antirattle spring includes a body portion, a pair of divergent arms extending axially outwardly from said body portion to a position outside said pair of friction elements, a pair of resilient arms integral with said pair of divergent arms, respectively, and extending axially toward one another and radially toward said disc from said pair of divergent arms to engage said pair of friction elements, said body portion being secured to the radially outer surface of one of said support arms and said divergent and resilient arms extending substantially in a direction toward said other support arm in order to position said pair of resilient arms on top of said pair of friction elements.

* * * * *